United States Patent [19]
Kreuz et al.

[11] Patent Number: 5,787,604
[45] Date of Patent: Aug. 4, 1998

[54] PLASTIC STRAND GRANULATION PLANT HAVING A DRAINING AND DRYING MODULE

[75] Inventors: Ulrich Kreuz, Erdmannhausen; Ludwig Zollitsch, Korntal-Münchingen; Friedrich Hild, Beilstein, all of Germany

[73] Assignee: C.F. Scgeer & Cie. GmbH & Co., Germany

[21] Appl. No.: 725,848

[22] Filed: Oct. 4, 1996

[30] Foreign Application Priority Data

Oct. 4, 1995 [DE] Germany ................... 195 36 933.5

[51] Int. Cl.$^6$ ................................................ F26B 7/00
[52] U.S. Cl. .................. 34/384; 34/65; 34/207; 34/216
[58] Field of Search ........................ 34/61, 65, 66, 34/207, 216, 217, 384, 387

[56] References Cited

U.S. PATENT DOCUMENTS

| | | | |
|---|---|---|---|
| 4,506,457 | 3/1985 | Lehtinen | 34/66 |
| 4,632,752 | 12/1986 | Hunke | 210/173 |
| 4,887,362 | 12/1989 | Rautakorpi | 34/216 |
| 5,474,435 | 12/1995 | Hunke | 425/71 |

FOREIGN PATENT DOCUMENTS

| | | |
|---|---|---|
| 0 143 944 | 1/1989 | European Pat. Off. . |
| 2 218 210 | 4/1972 | Germany . |
| 39 00 250 C2 | 11/1990 | Germany . |
| 2 271 140 | 4/1994 | United Kingdom . |
| WO 96/14195 | 11/1994 | WIPO . |

*Primary Examiner*—Ronald C. Capossela
*Attorney, Agent, or Firm*—Darby & Darby, P.C.

[57] ABSTRACT

An apparatus for cooling, drying and granulating plastic strands emerging from a nozzle in molten form includes a discharge channel washed with cooling water through which the plastic strands are conducted. A draining and drying device forms a separate unit following the lower end of the discharge channel and has a device subjecting the plastic strands to an air stream and a water collecting apparatus disposed under the plastic strands. A granulator follows the draining and drying device.

20 Claims, 3 Drawing Sheets

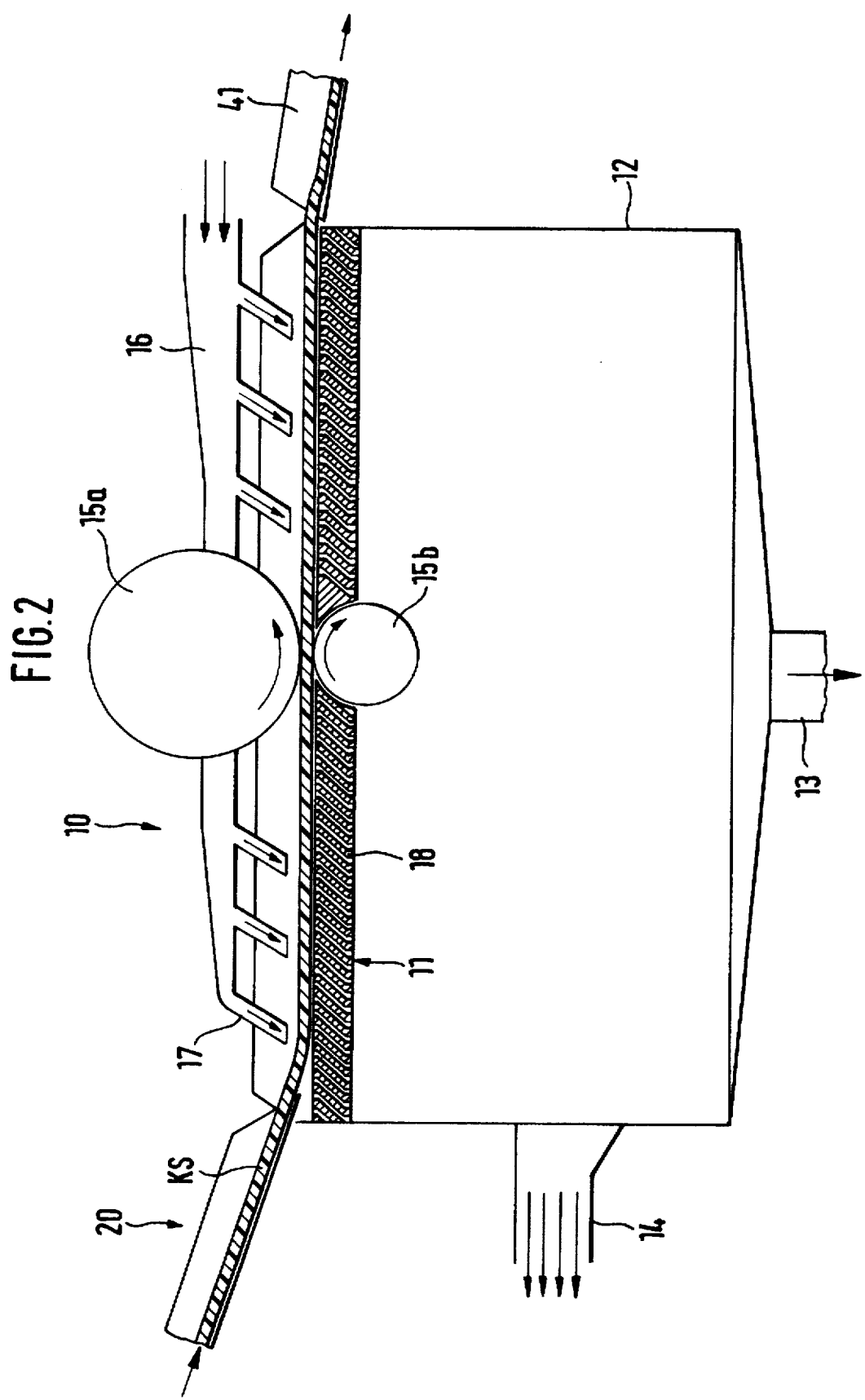

PLASTIC STRAND GRANULATION PLANT HAVING A DRAINING AND DRYING MODULE

BACKGROUND OF THE INVENTION

The present invention relates to plastic strand granulation plants and, more specifically, to improved draining and drying modules for plastic strand granulation plants.

Granulation plants with water-washed, inclined discharge channels in which extruded plastic strands are cooled while being simultaneously passed on to a granulator have been known in granulating technology for some time. The granulator can be preceded or followed by devices which serve to remove the cooling water and dry the plastic material. If the cooling water is removed gravimetrically before the plastic strands pass into the granulator, one speaks of a "wet cut". If the plastic strands are additionally dried before entering the granulator, one speaks of a "dry cut". The present invention relates to a granulation plant for a dry cut.

A plant of this type is shown, for example, in German patent application DE-A-22 18 210, FIG. 4, where the water-washed discharge channel ends over an obliquely upward directed, circulating screen belt so that the water drips through the screen belt into a water collecting vessel. A blower is additionally disposed over the screen belt to blow off the water adhering to the plastic strands. The circulating screen belt thus transports the plastic strands from the discharge channel to a following granulator while simultaneously drying them.

European patent application EP 0 143 944 B1 describes an apparatus for a dry cut wherein the draining and drying device formed by the circulating belt and the blower is replaced by two separate and succeeding zones integrated in the discharge channel. The plastic strands are not transported further in these zones by means of a circulating screen belt, but slide independently through the two zones into the granulator, following the slope descending force.

One disadvantage of this apparatus is that it involves relatively great construction effort due to the constructional integration of the two zones in the discharge channel and, on the other hand, permits no flexible use of the two zones in the total system of the granulation plant. The integration of the zones in the discharge channel makes it difficult to adapt the granulation plants readily to alternative draining and drying techniques, or to omit the two zones. In addition, this integration makes it impossible to place only a draining zone in front (in the case of a wet cut). Furthermore, the repair of one of the zones integrated in the discharge channel requires the entire granulation plant to be shut down.

DE 39 00 250 C2 relates to a development of EP 0 143 944 B1, which deals with improving the sliding of the plastic strands through the draining and drying zones. For this purpose, air nozzles are disposed in the drying zone from below in such a way as to guarantee largely frictionless sliding of the strands to the granulator. The air stream conducted by the inlet nozzles simultaneously throws residual water off the plastic strands. The advantage of smooth sliding is thus obtained at the price that the water particles blown off the plastic strands whirl through space. It is unsuitable to cover the discharge channel to prevent this side-effect since that would adversely affect the drying effect.

SUMMARY OF THE INVENTION

One object of the present invention is to provide a plastic granulation plant having improved construction, particularly with regard to improving the maintainability and the flexible applicability of the plant.

A further object of the invention is to provide a more efficient mechanism for drying the plastic strands.

The present invention provides a draining and drying device consisting of a stationary grate which is substantially horizontal or inclined slightly upward in the direction of transport of the plastic strands through which the plastic strands are transported to the granulator. A pair of feed rollers receive the plastic strands between each other, the upper feed roller being disposed over the grate and the lower feed roller under the grate. A water drain and air suction connection is integrated with the water collecting apparatus.

In comparison to DE-A-22 18 210, which forms the preamble of claim 1, the present invention has a tremendously simplified construction through replacement of the circulating, screenlike transport belt (which requires relatively frequent repair) with a stationary grate. The grate is substantially horizontal or inclined slightly upward in order to exploit additionally the influence of gravity on the drying of the plastic strands. To guarantee the transport of the plastic strands, a pair of feed rollers is provided. This construction is much simpler and less often in need of repair than that with circulating screen belts. Furthermore, the air stream that dries the plastic strands is drawn in using suction which has the advantage that no water particles are whirled up into the air. The draining and drying device of the apparatus according to the invention is formed as a compact module which can be shorter than the circulating screen belt.

In comparison to EP 0 143 944 B1, the two portions disclosed therein for draining and drying are greatly simplified in the present invention from a construction standpoint by being combined in one portion, on the one hand, and by using a module that is separate from the channel, on the other hand. Because the module can be replaced independently of the channel, this construction facilitates repair and maintenance work thereon. Altogether, the entire granulation plant is more flexible to use since the draining and drying module can be replaced easily with only a draining module or with a subsequently developed, improved module. The combination of the draining and drying portions in a single relatively short portion shortens the total length of the granulation plant by the area of the draining portion. This saves space and reduces costs in addition to the constructional advantages. Furthermore, the module can be easily combined with channels of different lengths.

In an advantageous embodiment of the invention, a blower is provided over the plastic strands in addition to the suction apparatus. Selective, linear blowing of compressed air onto the plastic strands from a plurality of air outlet nozzles disposed perpendicular to the direction of transport thereof greatly improves the drying of the strands.

To keep the total length of the granulation plant as short as possible, the air stream produced by the blower is applied substantially over the entire length of the grate.

The air stream is preferably directed obliquely from above, against the direction of transport of the plastic strands so that the water droplets (moving along the plastic strands against the direction of transport due to the effect of the air stream) connect with following water droplets to form larger drops which drop off the strands more easily.

To improve this effect, the grate is formed as a bar grate disposed perpendicular to the direction of transport of the plastic strands. Thus, the grate performs a stripping function to some extent. The individual bars are disposed with their cross section in such a way that if the air stream hits the bars obliquely, the air stream can pass through the bars unhindered. For this reason, the bars are preferably constructed with an elongate cross section, the cross section being inclined from the bottom to the top in the direction of transport of the strands.

BRIEF DESCRIPTION OF THE DRAWINGS

The invention will be described in the following by way of example with reference to the adjoined drawings, in which:

FIG. 2 shows a special embodiment of the draining and drying module of FIG. 1.

DESCRIPTION OF THE PREFERRED EMBODIMENT

Figure 1:
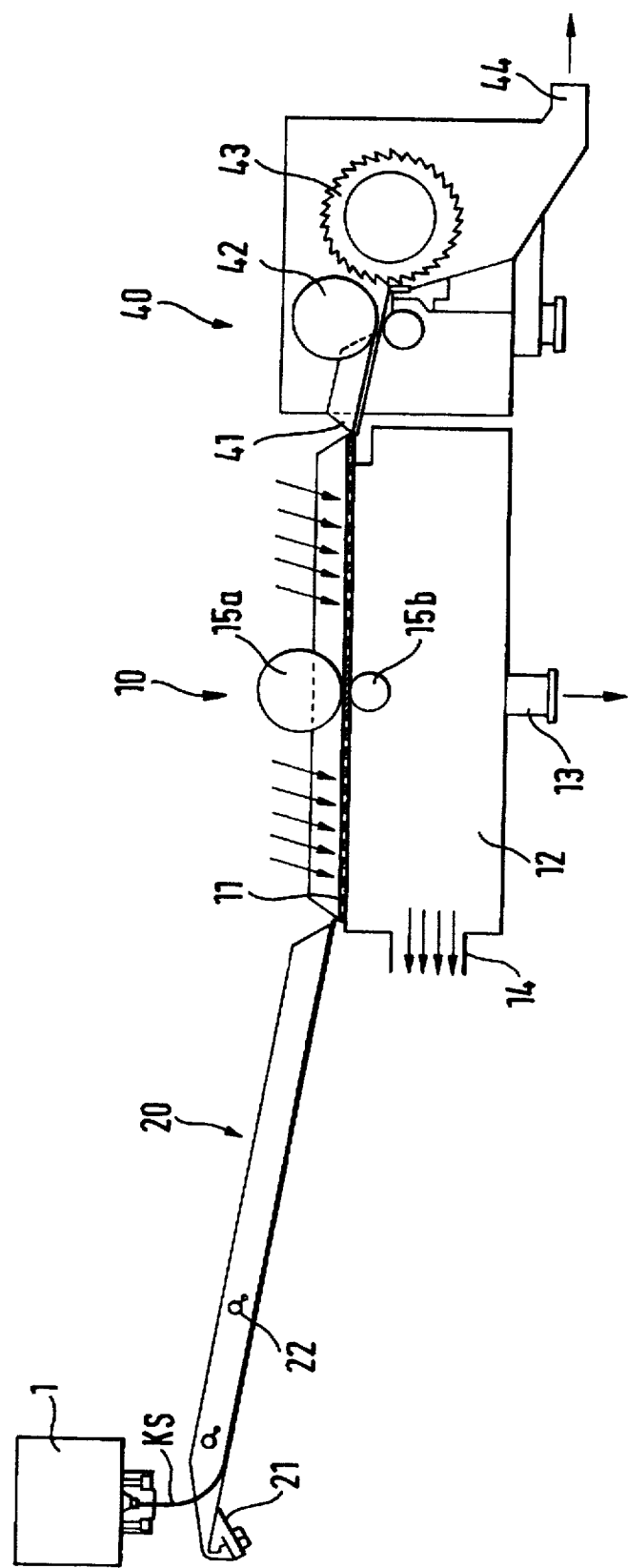
FIG. 1 shows a plastic strand granulation plant with an inventive draining and drying module.
Figure 1A:
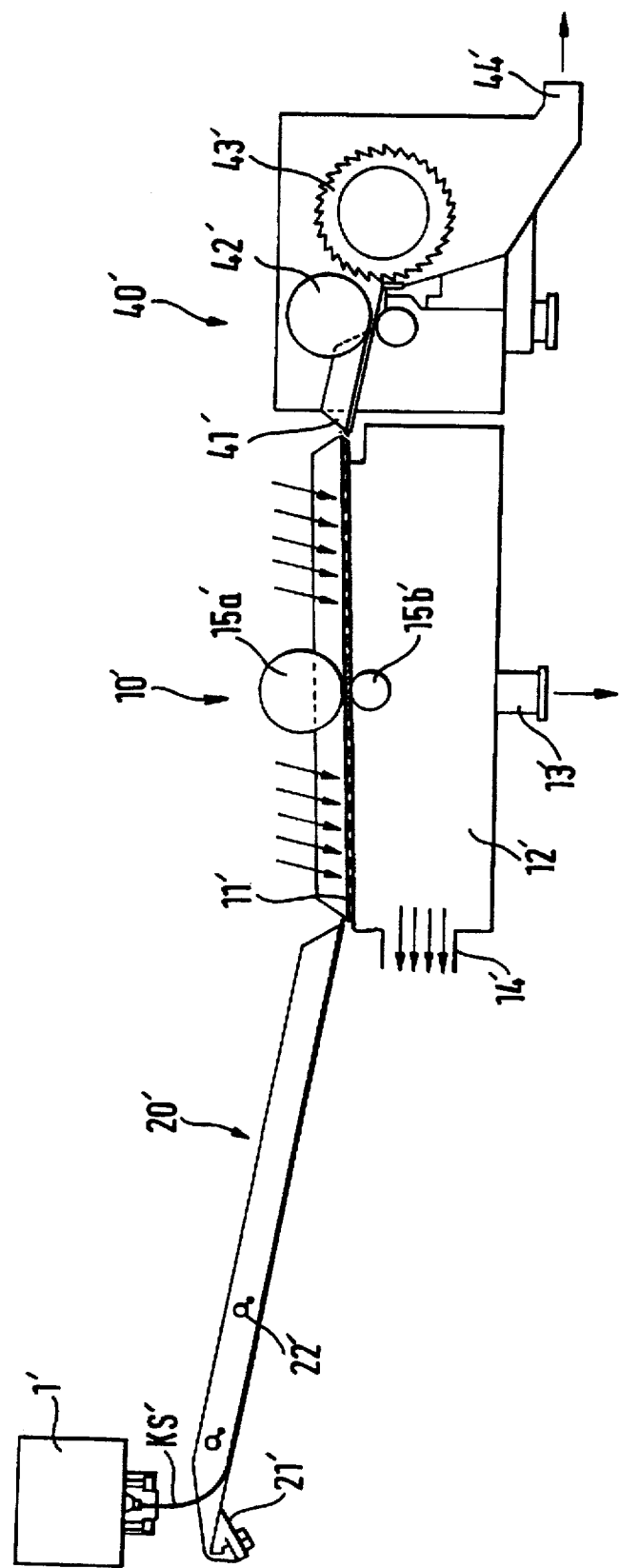
FIG. 1a shows a variational form of the granulation plant of FIG. 1 in which the grate of the draining and drying module is inclined slightly.

FIG. 1 shows a plastic strand granulation plant in which plastic strand KS emerges from extruder head 1 and falls onto slanted discharge channel 20. Discharge channel 20 has cooling water feed device 21 at the upper end thereof. The cooling water flows down discharge channel 20 thereby taking along plastic strands KS. In this way, plastic strands KS are simultaneously cooled and transported. Additionally, cooling water is sprayed through spray nozzles 22 from above onto plastic strands KS sliding down the discharge channel.

The lower end of discharge channel 20 ends over draining and drying module 10 which substantially comprises grate 11, collecting vessel 12 disposed thereunder for the cooling water falling off discharge channel 20 and plastic strands KS, and a feed device formed from two feed rollers 15a and 15b for actively transporting plastic strands KS. Collecting vessel 12 is provided on the bottom thereof with water drain 13 through which the cooling water is returned to the cooling water circulation. The collecting vessel has an air suction port 14 to which a suction plant (not shown) is connected for drawing air through grate 11 into the collecting vessel. The air catches water droplets adhering to the plastic strands and draws them into the collecting vessel. On the air suction port 14 there is a water separator (not shown) that serves to prevent cooling water from passing into the suction plant.

Plastic strands KS are fed by means of feed rollers 15a, 15b over bar grate 11 to granulator 40. The granulator inlet port 41 is located under the back end of the grate. Behind inlet port 41 there is usually a pair of draw-off rollers 42 for feeding plastic strands KS to following cutter block 43. The granulated plastic is passed on through outlet port 44.

Feed rollers 15a, 15b can be formed in a similar manner as the pair of draw-off rollers 42 are formed, upper feed roller 15a being disposed over grate 11 and lower feed roller 15b under grate 11, and a gap being provided between rollers 15a, 15b to allow the plastic strands to be threaded up and transported without being squeezed. It is sufficient if only one of the feed rollers 15a, 15b is driven. However, the second feed roller can be co-driven mechanically or in frictional engagement via the driven roller. It may be advantageous to synchronize feed rollers 15a, 15b with the pair of draw-off rollers 42.

FIG. 2 shows a special embodiment of draining and drying module 10. In addition to the air suction provided by air suction port 14, compressed air is directed onto plastic strands KS from above by blower device 16. This provides more effective drying of the plastic strands. To exploit the available space optimally, compressed air is blown out onto the plastic strands over the entire surface of grate 11 from the upstream end to the downstream end thereof. The air is preferably discharged through a plurality of air outlet nozzles disposed perpendicular to the direction of transport of the strands in order to focus the compressed air, thereby improving the drying effect.

By inclining the air outlet nozzles slightly obliquely from above against the direction of transport of the plastic strands, the module blows the cooling water droplets off the plastic strands more effectively. The drops travel along the plastic strands against the direction of transport thereof due to the oncoming air flow until they unite with the following water drops and become so large that they drop off the plastic strands.

Grate 11 consists of bars 18 with an elongate cross section which are disposed perpendicular to the direction of transport of the strands and inclined so as to allow unhindered passage of the obliquely oncoming compressed air through bar grate 11.

About eighty percent (80%) of the air throughput of a draining and drying module comes from the surroundings and twenty percent (20%) from blower device 16. The ventilator connected to blower device 16 is not specified in the drawings. The air guiding channel of blower device 16 has a variable cross section so that the compressed air fed in by the ventilator has approximately the same outlet pressure at all air outlet nozzles 17.

While a specific embodiment of the invention is disclosed as typical, the invention is not limited to this particular form, but rather is applicable broadly to all such variations as fall within the scope of the appended claims. The specific structure discussed in detail above is merely illustrative of a specific embodiment of the invention.

What is claimed is:

1. An apparatus for cooling, drying and granulating plastic strands emerging from a nozzle in molten form, comprising:
    a discharge channel washed with cooling water through which the plastic strands are conducted;
    a draining and drying device forming a separate unit following a lower end of the discharge channel and having a device subjecting the plastic strands to an air stream and a water collecting apparatus disposed under the plastic strands; and
    a granulator following the draining and drying device the draining and drying device comprising:
    a stationary grate through which the plastic strands are conducted to the granulator;
    a pair of feed rollers receiving the plastic strands between each other, the upper feed roller being disposed over the grate and the lower feed roller under the grate; and
    a water drain and air suction connection integrated in the water collecting apparatus.

2. The apparatus of claim 1 further including a blower device disposed over the grate.

3. The apparatus of claim 2 wherein the blower device distributes the air stream substantially over the entire length of the grate.

4. The apparatus of claim 3 wherein the air outlet nozzles are directed obliquely from above against the direction of transport of the plastic strands.

5. The apparatus of claim 4 wherein the bars have an elongate cross section and are inclined from the bottom to the top in the direction of transport of the plastic strands.

6. The apparatus of claim 3 wherein the grate is a bar grate with substantially horizontal bars disposed perpendicular to the direction of transport of the plastic strands.

7. The apparatus of claim 3 wherein the blower device includes a plurality of air outlet nozzles disposed over the grate perpendicular to the direction of transport of the plastic strands.

8. The apparatus of claim 4 wherein the air outlet nozzles are directed obliquely from above against the direction of transport of the plastic strands.

9. The apparatus of claim 7 wherein the grate is a bar grate with substantially horizontal bars disposed perpendicular to the direction of transport of the plastic strands.

10. The apparatus of claim 2 wherein the air outlet nozzles are directed obliquely from above against the direction of transport of the plastic strands.

11. The apparatus of claim 10 wherein the grate is a bar grate with substantially horizontal bars disposed perpendicular to the direction of transport of the plastic strands.

12. The apparatus of claim 2 wherein the grate is a bar grate with substantially horizontal bars disposed perpendicular to the direction of transport of the plastic strands.

13. The apparatus of claim 1 wherein the grate is a bar grate with substantially horizontal bars disposed perpendicular to the direction of transport of the plastic strands.

14. The apparatus of claim 1 wherein the grate is substantially horizontal.

15. The apparatus of claim 1 wherein the grate is inclined slightly upward in a direction of transport of the plastic strands.

16. The apparatus of claim 15 further including a blower device disposed over the grate.

17. The apparatus of claim 16 wherein the blower device distributes the air stream substantially over the entire length of the grate.

18. The apparatus of claim 17 wherein the blower device includes a plurality of air outlet nozzles disposed over the grate perpendicular to the direction of transport of the plastic strands.

19. The apparatus of claim 15 wherein the air outlet nozzles are directed obliquely from above against the direction of transport of the plastic strands.

20. The apparatus of claim 19 wherein the grate is a bar grate with substantially horizontal bars disposed perpendicular to the direction of transport of the plastic strands.

* * * * *